June 27, 1950 L. E. GILREATH 2,513,165
DISK TYPE CLOD CRUSHER
Filed Oct. 6, 1947
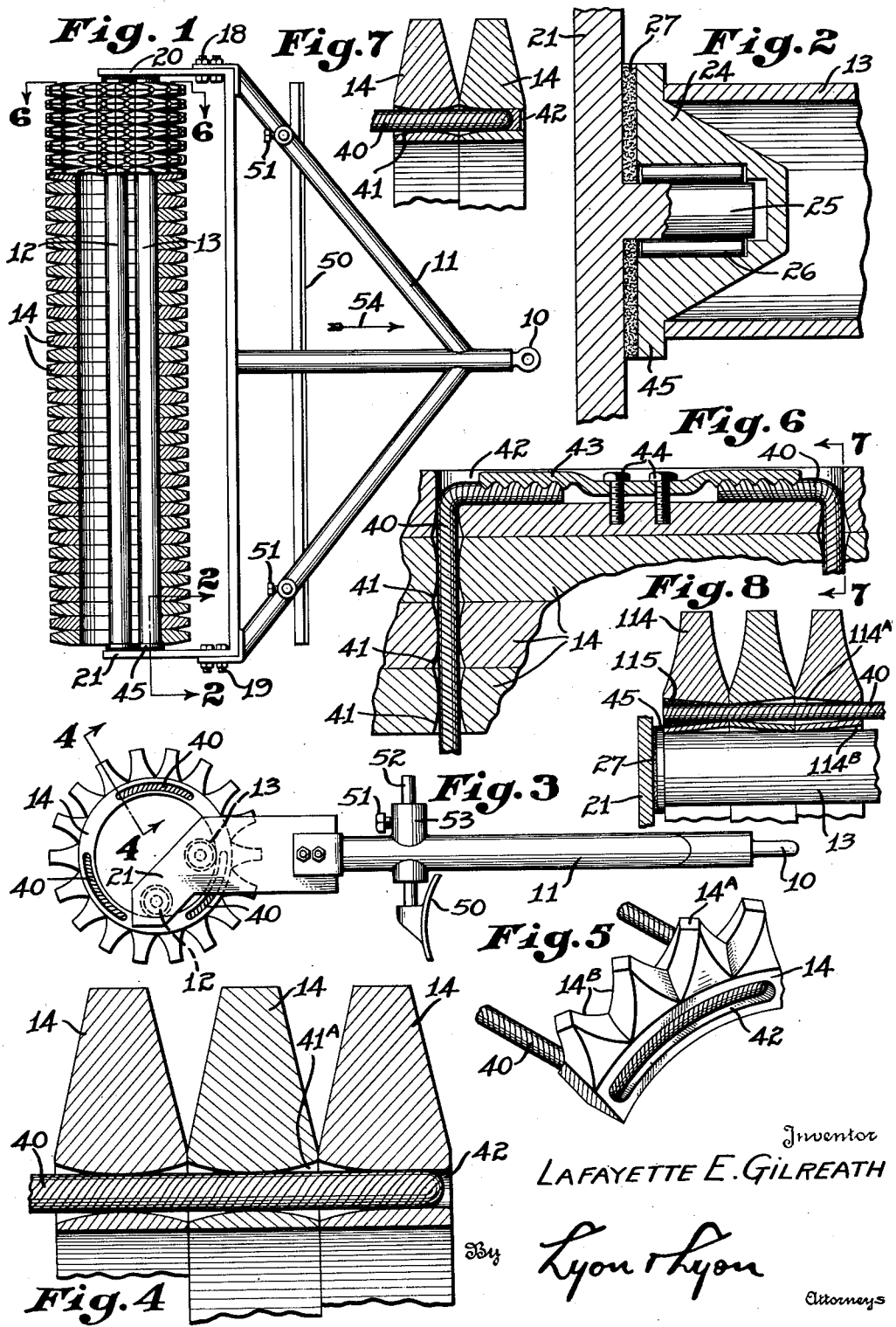
Inventor
LAFAYETTE E. GILREATH
By Lyon & Lyon
Attorneys Patented June 27, 1950

2,513,165

UNITED STATES PATENT OFFICE 2,513,165

DISK TYPE CLOD CRUSHER

Lafayette E. Gilreath, Fresno, Calif., assignor to Lyman G. Perkins, Fresno, Calif.

Application October 6, 1947, Serial No. 778,109

9 Claims. (Cl. 55—77)

The present invention relates to agricultural earth working implements of the roller type useful in seed bed preparing and cultivating.

An object of the present invention is to provide an improved agricultural implement of the type specified which efficiently breaks up clods of earth disposed in uneven terrain in such a manner as to prevent or cause the formation of air pockets which otherwise subsequently would tend to cause drying out of the subsoil.

Another object of the present invention is to provide a ground pulverizer comprising a plurality of ground engaging rings suspended in a novel manner to allow their ready adaption to contact soil in uneven terrain, such as small hills or ridges.

Still another object of the present invention is to provide an improved ground pulverizer of the type specified in which the individual components are of simple construction, of small number, and which may be readily and quickly assembled without the use of skilled personnel.

Still another object of the present invention is to provide a device of the type specified in which a plurality of concentrically mounted ground engaging rings are suspended in a novel manner for independent relative movement with respect to adjacent ones thereto, the assembled rings being propelled in a novel manner to assure contact of individual rings with the ground in uneven terrain.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1 is a view in plan elevation and partially a longitudinal section of a ground pulverizer embodying the present invention.

Figure 2 is a sectional view taken substantially on the line 2—2 of Figure 1.

Figure 3 is a view in side elevation of the device shown in Figure 1.

Figure 4 is a sectional view taken substantially on the line 4—4 of Figure 3.

Figure 5 is a perspective view of a portion of the device shown in Figure 3.

Figure 6 is a sectional view taken substantially as indicated by the arrows 6—6 in Figure 1.

Figure 7 is a sectional view taken substantially on the line 7—7 of Figure 6.

Figure 8 is a sectional view showing a modified arrangement.

The ground pulverizer shown in Figure 1 may be drawn by a tractor or animals by suitable couplings attached to the eye 10 of the triangularly shaped frame or yoke member 11 having a pair of transversely extending bearing rods 12 and 13 which engage and pass through a plurality of toothed rings 14. The manner in which the rotatable bearing rods 12 and 13 engage the plurality of rings 14 and the means whereby the individual toothed rings 14 are held together for independent relative movement form important features of the present invention.

The yoke or frame 11 may take different forms and shapes, and have joined thereto, for example, by means of bolt and nut connections 18 and 19, a pair of downwardly extending bearing support members 20 and 21, respectively. The bearing members 12 and 13 are supported for rotational movement with respect to the members 20 and 21 as indicated in Figures 2 and 3.

Referring specifically to Figures 2 and 3, the bearing members 12 and 13 may be journaled on the members 20 and 21 in many different manners, as is well understood in the art, but the relative positions of the axes of members 12 and 13 with respect to the longitudinal axis of the frame member 11 forms an important feature of the present invention, it being noted that the rotational axis of the bearing member 13 is disposed in the plane of the frame member 11 so that the direction of a pulling force applied to the frame 11 passes through the rotational axis of the bearing shaft 13. Furthermore, when the direction of such pulling force is in a horizontal plane the rotational axis of the bearing shaft 12 is at its lowest point with respect to the ground. In other words, the bearing shaft 13 may be characterized as the "pulling" roller and the bearing shaft 12 may be characterized as the "ground pressing" roller.

The rollers 12 and 13 may be mounted as indicated in Figure 2 wherein the hollow cylindrical roller 13 has a hub member 24 attached thereto. The hub member 24 is mounted for rotation on the inwardly extending stationary shaft 25 depending from the bearing holding member 21 with roller bearing members 26 interposed between the hub 24 and the stationary shaft 25, and with an annular shaped dust closure member 27 interposed between adjacent parallel faces of the hub 24 and the member 21.

The rings 14 are assembled as a unit, with limited independent relative movement allowed between adjacent rings by one or a plurality of cables 40 passing therethrough.

The cable 40 may comprise but one cable passing in turn through six equally spaced different axially aligned openings 41 in the body of the rings 14 or, as shown in the drawings, such cable, preferably, is made in three separate sections with opposite ends thereof clamped together as indicated in Figure 6.

The rings 14 are all of identical construction except the two end rings which additionally have six equally spaced arcuate grooves 42 therein for recessing the cable 40 as well as the clamping member 43 (Figures 5 and 6). The clamping member 43 is fastened, for example and not as a limitation, by bolts 44 entering additional tapped holes in one of the end rings with the free ends thereof clamping adjacent ends of the same cable 40 against the grooved face of such outer ring.

In order to prevent undue end play of the rings 14 thus assembled, the end rings on the assembly are arranged to snugly move against annular shoulders 45 on hub members 24, the bearing rod members 12, 13 having the correct length in relationship to the stacked length of rings 14 to assure this condition.

The rings 14 preferably have integrally formed ground engaging cleats of the type shown in Figure 5. These cleats 14A have diamond shaped outer surfaces with straight edges 14B joining adjacent cleats so as to prevent the packing of earth between such adjacent cleats. In other words there are no parallel surfaces on adjacent cleats 14A between which earth may pack in use.

Referring to the preferred arrangement whereby the rings 14 are held in assembled position by the cable 40, all of the rings 114 are of identical construction, including the two-end rings. Each one of the rings 114 has a conical opening therethrough through which the cable 40 is threaded. It is noted that the rings 114 are stacked as shown in Figure 8 with corresponding mouths of the openings 114A adjacent to one another and with the larger mouth of the end ring facing outwardly. In the construction shown in Figure 8, six separate cable strands 40 of a length equal to the stacked length of the rings 114 is used instead of three cables, edge doubled back upon itself as is the case in the construction shown in Figure 3. In the construction shown in Figure 8, the ends of cable 40 are permanently anchored in the end rings 114 by material such as Babbitt metal 115, sodder and the like. The desirability for making the openings 114A conical is thus made manifest. The advantages residing in such conical construction is that a good bearing surface is provided for the bearing metal 115 and also, in the case of the intermediate rings 114, a space is provided within which the cable 40 may move so that there may be relative movement between adjacent intermediate rings 114. Further, no special end rings 114 are required but all of the rings 114 may be of identical construction. In order that each ring 114 may move relatively to the bearing member 13, the inner opening 114B through which the bearing member 13 passes is tapered as shown in Figure 8 in which case the ring member 114 engages its bearing member 13 substantially only on a line contact about which the ring member 114 may pivot in use.

Referring again to Figure 4, the openings 41 in the rings 14, through which the cable 40 passes have tapered or enlarged mouths 41A for the same purpose served by the tapered openings 114A in Figure 8; namely, to allow relative movement between adjacent rings 14.

If desired, a transversely extending scraper member 50 may be held in adjustable and releasable position on the frame 11 by the bolts 51. The scraper 50 has a pair of spaced rods 52 extending upwardly therefrom arranged for slidable movement in the vertical sleeves 53 which are affixed to the frame 11 by winding, brazing and the like. Bolt 51 is screw-threadedly mounted in the sleeve 53 with its inner free end arranged to contact and lock the rod 52. Thus, when the device shown in Figure 1 is moved in its forward direction indicated by the arrow 54 the scraper 50 may initially level the ground before it is subsequently pulverized by the rings 14. When the scraper meets obstructions, the frame 11 is moved vertically upwardly by such obstruction without raising the ground engaging rollers 14 from the ground. This is true because of the particular coupling between the bearing members 12, 13 and the stack of rings 14. Another advantage of this particular coupling between bearing members 12, 13 and the stack of rings 14 is that when the unit shown in Figure 1 is moved in a direction opposite to that indicated by the arrow 54, the roller bearing members 12, 13 are initially moved relative to the stacked rings 14 to a position wherein the bottom roller 12 is elevated to a position higher than that shown in Figure 3 in which case the frame 11 and attached scraper 50 are also elevated thereby to move the scraper 50 from a position where it otherwise might engage obstructions.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. An earth working implement comprising a plurality of independently movable ring members, each having a flexible cable extending therethrough arranged to maintain the rings in assembled relationship with some limited movement in the radial direction therebetween.

2. In an earth working device of the character described, a ground engaging roller, a frame member arranged to pull said roller along the ground, said frame member having two bearing rollers mounted thereon, said ground engaging roller being hollow with said bearing rods passing therethrough, one of said bearing rods being arranged in the normal pulling position of said frame to engage the inner portion of the ground engaging roller at its lowest point and with the other bearing rod engaging the interior portion of said ground engaging roller in a line lying in the plane of the applied force to said frame whereby the first mentioned bearing rod serves as a ground pressing rod and the other rod serves as a pulling rod.

3. In a device of the character described, a ground engaging roller, a frame member arranged to pull said roller, said frame having a ground pressing rod and a pulling rod mounted thereon with said rods passing axially through said ground engaging roller and engaging the inner portions of said roller along different lines.

4. A ground engaging roller comprising a plurality of individual rings having ground engaging cleats on their outer peripheries, and flexible cable means passing through each of said rings in the axial direction of said roller to maintain said rings in assembled condition with limited independent relative movement between adjacent rings.

5. In an earth working device of the character described, a hollow ground engaging roller comprising a plurality of individual rings having ground engaging cleats on their outer peripheries with flexible cable means passing therethrough to maintain the rings in stacked position with the allowance of limited relative movement therebetween, a frame member arranged to pull said ground engaging roller, said frame member having a pair of bearing rods extending axially through the ground engaging roller, each of said bearing rods being mounted for rotation on said frame, with one of said bearing rods engaging the inner portion of the roller at its lowermost point and with the other one of said bearing rods engaging the inner portion of said roller along a line lying substantially in the plane of the frame.

6. The invention defined in the next preceding claim characterized by stop means mounted on said frame arranged to limit axial movement of said roller.

7. In a device of the character described, a ground engaging ring having a conical opening therethrough, and a flexible cable passing through said conical opening.

8. In a device of the character described, a ground engaging ring having a conical opening therethrough, a flexible cable passing through said opening, and means maintaining the end of said cable within said conical opening.

9. In an earth working device of the character described, a plurality of stacked rings each having conical openings therethrough with corresponding mouths thereof in adjacent rings abutting, cable means extending through said conical openings, said stacked rings each also having a tapered opening therethrough with the wall thereof arranged to engage a bearing rod on a line contact.

LAFAYETTE E. GILREATH.

REFERENCES CITED

The following references are of record in the file of this patent:

UNITED STATES PATENTS

| Number | Name | Date |
|---|---|---|
| 730,837 | Nichols | June 9, 1903 |
| 1,190,257 | Henderson | July 4, 1916 |
| 2,288,110 | Schmeiser | June 30, 1942 |

FOREIGN PATENTS

| Number | Country | Date |
|---|---|---|
| 138,532 | France | Sept. 2, 1880 |